US010403929B2

(12) United States Patent
Jeon et al.

(10) Patent No.: US 10,403,929 B2
(45) Date of Patent: Sep. 3, 2019

(54) ADDITIVE FOR CATHODE, METHOD FOR PREPARING THE SAME, CATHODE INCLUDING THE SAME, AND LITHIUM SECONDARY BATTERY INCLUDING THE SAME

(71) Applicant: LG Chem, Ltd., Seoul (KR)

(72) Inventors: Hyelim Jeon, Daejeon (KR); Donghun Lee, Daejeon (KR); Eunsol Lho, Daejeon (KR); Sang wook Lee, Daejeon (KR); Wang Mo Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/201,460

(22) Filed: Nov. 27, 2018

(65) Prior Publication Data

US 2019/0165412 A1 May 30, 2019

(30) Foreign Application Priority Data

Nov. 30, 2017 (KR) .................... 10-2017-0163114
Oct. 18, 2018 (KR) .................... 10-2018-0124563

(51) Int. Cl.
| | | |
|---|---|---|
| *H01M 4/36* | (2006.01) | |
| *H01M 4/525* | (2010.01) | |
| *H01M 10/0525* | (2010.01) | |
| *H01M 4/505* | (2010.01) | |
| *H01M 4/02* | (2006.01) | |

(52) U.S. Cl.
CPC ....... *H01M 10/0525* (2013.01); *H01M 4/364* (2013.01); *H01M 4/505* (2013.01); *H01M 4/525* (2013.01); *H01M 2004/028* (2013.01); *H01M 2300/0065* (2013.01); *H01M 2300/0091* (2013.01)

(58) Field of Classification Search
CPC ...... H01M 4/131; H01M 4/362; H01M 4/364; H01M 4/366; H01M 4/505; H01M 4/525; H01M 10/0525; H01M 2004/028; H01M 2300/0065; H01M 2300/0091
See application file for complete search history.

(56) References Cited

U.S. PATENT DOCUMENTS

| | | | | |
|---|---|---|---|---|
| 2002/0164528 | A1* | 11/2002 | Sunagawa | .......... C01G 45/1242 429/231.3 |
| 2010/0086843 | A1* | 4/2010 | Kawai | ................. H01M 2/0257 429/163 |
| 2013/0171524 | A1 | 7/2013 | Cho et al. | |
| 2015/0372304 | A1 | 12/2015 | Hasegawa et al. | |

FOREIGN PATENT DOCUMENTS

| | | | | |
|---|---|---|---|---|
| JP | 09147863 | A * | 6/1997 | ............. H01M 4/58 |
| JP | H09147863 | A | 6/1997 | |
| JP | 3971911 | B2 | 9/2007 | |
| JP | 2015-088268 | A | 5/2015 | |
| KR | 10-2013-0079109 | A | 7/2013 | |
| KR | 10-1383360 | B1 | 4/2014 | |
| KR | 10-2017-0015961 | A | 2/2017 | |
| WO | 2014-118834 | A1 | 8/2014 | |
| WO | WO-2014118834 | A1 * | 8/2014 | ............. H01M 4/62 |

OTHER PUBLICATIONS

Narukawa, S., Takeda, Y., Nishijima, M., Imanishi, N., Yamamoto, O., Tabuchi, M.—Anti-fluorite type Li6CoO4, Li5FeO4, and Li6MnO4 as the cathode for lithium secondary batteries, Solid State Ionics 122 (1999), pp. 59-64 (Year: 1999).*
N. Pentyala et al, Electrochimica Acta 56 (2011) 9851-9859, Aug. 27, 2011, p. 9854, Fig 5. (Year: 2011).*
Noh, M. et al, "Role of Li6CoO4 Cathode Additive in Li-Ion Cells Containing Low Coulombic Efficiency Anode Material", Journal of the Electrochemical Society, 159 (8) A1329-A1334 (2012).
McCusker, L.B. et al, "Rietveld refinement guidelines", J. Appl. Cryst. (1999) 32, pp. 36-50.

* cited by examiner

*Primary Examiner* — Anca Eoff
(74) *Attorney, Agent, or Firm* — Mintz Levin Cohn Ferris Glovsky and Popeo, P.C.; Kongsik S. Kim (57) ABSTRACT

Disclosed are a cathode additive of a lithium secondary battery and a method of preparing the same. The lithium secondary may have high irreversible capacity and further improved capacity characteristics.

10 Claims, 4 Drawing Sheets

ADDITIVE FOR CATHODE, METHOD FOR PREPARING THE SAME, CATHODE INCLUDING THE SAME, AND LITHIUM SECONDARY BATTERY INCLUDING THE SAME

CROSS-REFERENCE TO RELATED APPLICATION(S)

This application claims the benefit of Korean Patent Application No. 10-2017-0163114 filed on Nov. 30, 2017 and Korean Patent Application No. 10-2018-0124563 filed on Oct. 18, 2018, which applications are incorporated herein by reference in their entirety.

TECHNICAL FIELD

The present invention relates to a cathode additive of a lithium secondary battery, a method for preparing the same, a cathode including the same, and a lithium secondary battery including the same. The lithium secondary batter may have high irreversible capacity and further improved capacity characteristics by including the cathode additive.

BACKGROUND

Recently, demand for secondary batteries as an energy source has become rapidly growing. Among the secondary batteries, lithium secondary batteries having high energy density and voltage, long cycle life and low self discharge rate have been commercialized and widely used.

Although graphite is mainly used as an anode material of the lithium secondary battery, it is difficult to increase the capacity of the lithium secondary battery, since the capacity per unit mass of the graphite is as small as 372 mAh/g. Accordingly, an anode material for forming an intermetallic compound with lithium, such as silicon, tin and oxides thereof, has been developed and used as a non-carbon anode material having an energy density higher than that of graphite in order to increase the capacity of the lithium secondary battery. However, although the non-carbon anode material has high capacity, an initial efficiency is low, which causes a large lithium consumption during the initial charge-discharge, and a large irreversible capacity loss.

In the related arts, a method of overcoming the irreversible capacity loss of the anode using a material which can provide a lithium ion source or a storage material to the cathode material and which exhibits electrochemical activity after the first cycle so as not to deteriorate the performance of the entire battery has been studied and proposed. For instance, an oxide containing an excessive amount of lithium such as $Li_6CoO_4$ has been applied as a sacrificial cathode material or an irreversible additive (or an overdischarge-preventing agent) to the cathode.

However, when the irreversible additive is used, the capacity characteristics of the cathode may be insufficient. Therefore, even when the irreversible additive is used, further improvement in the capacity characteristics of the cathode and the lithium secondary battery including the same may be required.

SUMMARY OF THE INVENTION

Provided are, inter alia, a cathode additive of a lithium secondary battery having high irreversible capacity and capable of further improving capacity characteristics of the lithium secondary battery, and a method for preparing the same.

The present invention provides a cathode including the cathode additive and a lithium secondary battery including the cathode additive. The lithium secondary batter of the present invention may overcome the irreversible capacity loss of the anode material while exhibiting higher capacity characteristics even with use of the anode material having high energy density.

In one aspect, provided is a cathode additive for a lithium secondary battery. The cathode additive may include a composite represented by the following Chemical Formula 1:

[Chemical Formula 1]

$(1-y-z)(Li_6Co_{1-x}M_xO_4)-y(LiCo_{1-x}M_xO_2)-z(Li_2O)$ wherein M may include one or more elements selected from the group consisting of P, B, F, Ni, W, Ti, Zr, Mg and Al, $0 \leq x < 1.0$, y and z are molar ratios of $LiCo_{1-x}M_xO_2$ and $Li_2O$ contained in the composite of Chemical Formula 1, $0 < y \leq 0.10$, and $0 \leq z \leq 0.20$.

The "composite" as used herein refers to a material (e.g., solid material) including two or more components having different or separate characteristics such as chemical formula, shape, components, structure, phase, or physical properties. In certain embodiments, the composite may include two or more components that are physically or chemically attached or bound to each other. In certain embodiments, the composite may include two or more components that are mixed or admixed, aggregated, or co-precipitated.

The composite comprises the $Li_6Co_{1-x}M_xO_4$, the $LiCo_{1-x}M_xO_2$ and the $Li_2O$ physically mixed and connected to form a single particulate or a complex.

The term "particulate" as used herein refers to a separate and distinct particle that may include other particles having smaller size (sub-particles) in aggregated forms, without particularly limitation in sizes, shapes, arrangement or weights thereof. In certain embodiments, the particulate may be formed of sub-particles in a random mixture or aggregated form.

The composite of Chemical Formula 1 in the form of a single particulate or a complex may have an additional peak at 2θ of 18.98°±0.2° or 45.27°±0.2° in XRD (X-ray diffraction) analysis by Cu Kα X-ray (X-rα), and an intensity of the additional peak may be 2 to 25% based on an intensity of the peak at 2θ of 23.5°±0.2°.

The cathode additive comprises the $LiCo_{1-x}M_xO_2$ in an amount of greater than 0 wt % and 0.1 wt % or less, and the $Li_2O$ in an amount of 0 to 0.7 wt %, based on a total amount of the cathode additive as 100 wt %.

In another aspect, provided is a method for preparing the cathode additive of a lithium secondary battery. The method may include: forming a composite represented by the Chemical formula 1 by calcining and reacting a mixture including a cobalt precursor and a lithium precursor containing $Li_2O$ under an inert atmosphere at a temperature of 500° C. or more and lower than 700° C.

The mixture further may further include an M-containing precursor. The cobalt precursor may include one or more selected from the group consisting of cobalt oxide, cobalt hydroxide, cobalt oxyhydroxide, cobalt sulfate, cobalt nitrate, cobalt acetate, cobalt carbonate, cobalt oxalate, cobalt citrate, cobalt halide, cobalt phosphate, and hydrate thereof, and the M-containing precursor comprises an element M, and at least one selected from the group consisting of its oxide, hydroxide, oxyhydroxide, sulfate, nitrate, acetate, carbonate, oxalate, citrate, halide, phosphate and hydrate thereof.

Further provided is a cathode mix including the cathode additive as described herein; and a cathode active material. A weight ratio of the cathode additive:the cathode active material may be 1:99 to 35:65.

The cathode active material may include one or more selected from the group consisting of composite oxides of a metal of cobalt oxide, manganese oxide, and nickel oxide; and lithium.

Also provided is a lithium secondary battery including: a cathode including the cathode mix as described herein; an electrolyte; and an anode.

Other aspect of the invention are disclosed infra.

DETAILED DESCRIPTION

Hereinafter, the cathode additive according to the embodiment of the present invention, the method for preparing the same, and the like will be described in detail. Unless otherwise defined in this specification, all the technical and scientific terms used herein have the same meanings as what are generally understood by a person skilled in the related art to which the present invention belongs. Therefore, repeated descriptions of the same technical configurations and operations as in the prior art are omitted for clarity.

As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

In this disclosure, the term "about or approximately" or "substantially" is intended to have meanings close to numerical values or ranges specified with an allowable error and intended to prevent accurate or absolute numerical values disclosed for understanding of the present invention from being illegally or unfairly used by any unconscionable third party.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In an aspect of the present invention, provided is a cathode additive for a lithium secondary battery. The cathode additive may include a composite including $Li_6Co_{1-x}M_xO_4$, $LiCo_{1-x}M_xO_2$, and $Li_2O$. Particularly, M may comprises one or more selected from the group consisting of P, B, F, Ni, W, Ti, Zr, Mg and Al and $0 \leq x < 1.0$. Preferably, the composite may be represented by the following Chemical Formula 1:

$(1-y-z)(Li_6Co_{1-x}M_xO_4)$-$y(LiCo_{1-x}M_xO_2)$-$z(Li_2O)$ [Chemical Formula 1]

Preferably, y and z are molar ratios of $LiCo_{1-x}M_xO_2$ and $Li_2O$ contained in the composite of Chemical Formula 1, $0 < y \leq 0.10$, and $0 \leq z \leq 0.20$.

In an exemplary embodiment, the cathode additive may include a composite represented by the following Chemical Formula 1:

$(1-y-z)(Li_6Co_{1-x}M_xO_4)$-$y(LiCo_{1-x}M_xO_2)$-$z(Li_2O)$ [Chemical Formula 1]

wherein M comprises one or more elements selected from the group consisting of P, B, F, Ni, W, Ti, Zr, Mg and Al, $0 \leq x < 1.0$, wherein y and z are molar ratios of $LiCo_{1-x}M_xO_2$ and $Li_2O$ contained in the composite of Chemical Formula 1, $0 < y \leq 0.10$, and $0 \leq z \leq 0.20$. When a lithium precursor, a cobalt precursor and optionally an M-containing precursor are reacted and/or calcinated under an inert atmosphere at a temperature less than about 700° C., $LiCo_{1-x}M_xO_2$ can be formed together with $Li_6Co_{1-x}M_xO_4$ to form a cathode additive. Preferably, the $Li_6Co_{1-x}M_xO_4$ may be formed in the form of a single particulate or a composite. The thus formed $Li_6Co_{1-x}M_xO_4$ may act as an irreversible additive in the cathode for a lithium secondary battery.

The "a single particulate or a composite" is meant by a particle ("secondary particle") that may be formed by particles ("primary particle(s)") of each component. For example, the single particulate may be formed by the particles of each component physically mixed, and/or attached (e.g., connected) to each other and exist as an aggregated single particulate such as a secondary particle. Preferably, the primary particles of the components (e.g., $Li_6Co_{1-x}M_xO_4$ and $LiCo_{1-x}M_xO_2$) may be simply mixed, not in a form of an aggregated single particle. For example, each of the primary particles (e.g., $Li_6Co_{1-x}M_xO_4$ and $LiCo_{1-x}M_xO_2$) may be separately prepared and mixed.

Preferably, $Li_6Co_{1-x}M_xO_4$ contained in the cathode additive of the embodiment may not be in a tetragonal structure. The $Li_6Co_{1-x}M_xO_4$ as being used a cathode additive may be a mixture of $Li_{6-x}CoO_4$, $CoO_2$ and $LiCoO_2$ after providing an excessive amount of lithium ions to the anode as an irreversible additive in an initial charge-discharge process (for example, FIG. 2). As a result, when the cathode additive comprising the mixture is used in the lithium secondary battery, the $Li_6Co_{1-x}M_xO_4$ may act as an irreversible additive and no longer degrade or affect the performance or capacity of the battery. Further, $LiCo_{1-x}M_xO_2$ contained in the cathode additive or at least some of the mixtures derived from $Li_6Co_{1-x}M_xO_4$, for example, $LiCoO_2$, may act as a cathode active material by itself, thereby further improving the capacity characteristics of the cathode.

Accordingly, the cathode additive of exemplary embodiments of the present invention may suitably be used for a lithium secondary battery having high capacity by increasing the capacity characteristics of the cathode and the lithium secondary battery after acting as an irreversible additive. The cathode additive may also provide high irreversible capacity during the initial charge-discharge corresponding to the high capacity of the anode material.

Figure 1:
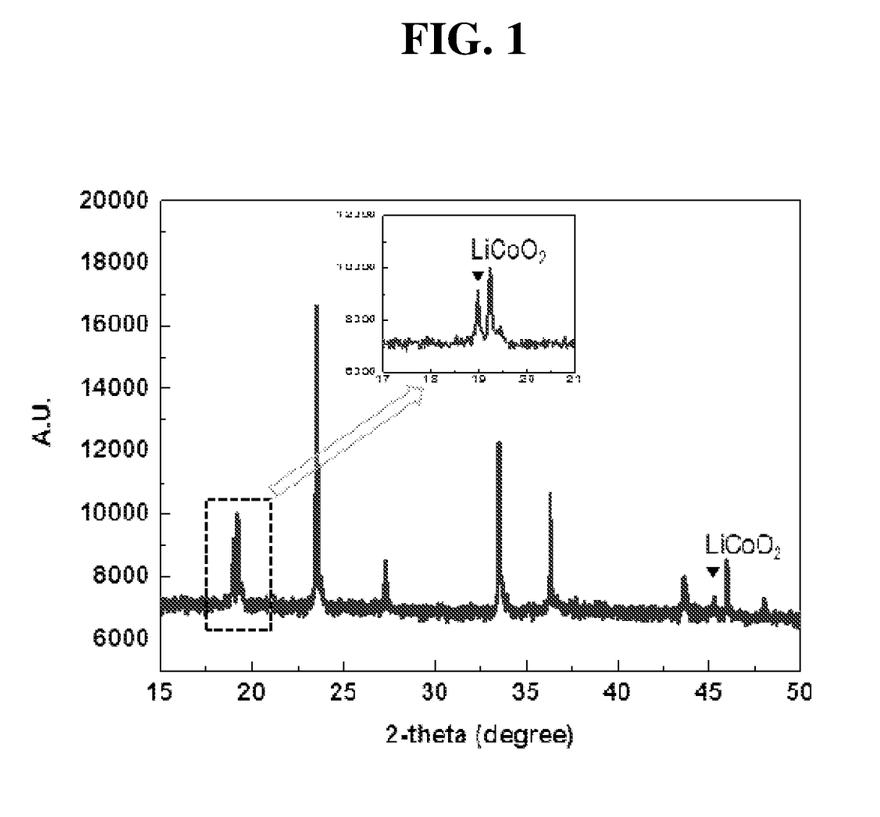
FIG. 1 is a graph showing the XRD analysis result of an exemplary cathode additive obtained in Example 1.

The cathode additive o may include $Li_6Co_{1-x}M_xO_4$ and $LiCo_{1-x}M_xO_2$ in the form of a single particulate or a complex, which may be confirmed by X-Ray Diffraction (XRD) analyzing the cathode additive in the form of a single secondary particle using Cu Kα X-ray (X-rα). For instance, the XRD analysis result is shown in FIG. 1. In particular, the XRD analysis result of the cathode additive of an exemplary embodiment may have a peak derived from $LiCo_{1-x}M_xO_2$ as well as a peak derived from $Li_6Co_{1-x}M_xO_4$, for example, a peak at 2θ of 18.98°±0.2° or 45.27°±0.2°, and the peaks of these components are clearly identified. As such, each of these components may constitute a single complex or the like. Further, the peak derived from $LiCo_{1-x}M_xO_2$, for example, a peak at 2θ of 18.98°±0.2° or 45.27°±0.2°, may have an intensity of about 2 to 25%, of about 5 to 18%, or particularly of about 7 to 15%, based on an intensity of the peak derived from $Li_6Co_{1-x}M_xO_4$, for example, a peak at 2θ of 23.5°±0.2°.

Also, the content of $LiCo_{1-x}M_xO_2$ contained in the cathode additive of the embodiment may be calculated by analyzing a relative intensity of the peak.

The cathode additive of the embodiment may include $LiCo_{1-x}M_xO_2$ in a molar ratio y greater than about 0, 0.1 or less, of about 0.01 to 0.07, or particularly of about 0.03 to 0.05, and $Li_2O$ in a molar ratio z of about 0 to 0.2, of about 0.001 to 0.18, of about 0.003 to 0.15, of about 0.005 to 0.1, or particularly of about 0.009 to 0.05. Alternatively, the cathode additive may include $LiCo_{1-x}M_xO_2$ in an amount of greater than 0 wt % and about 0.1 wt % or less, of about 0.002 to 0.08 wt %, or particularly of about 0.005 to 0.05 wt %, and $Li_2O$ in an amount of about 0 to 0.7 wt %, about 0.03 to 0.5 wt %, or particularly of about 0.09 to 0.3 wt %, based on a total amount of the cathode additive as 100 wt %.

The cathode additive according exemplary embodiments of the present invention may be prepared easily and effectively while being able to function properly as an irreversible additive during the initial charge-discharge, and the capacity characteristics of the cathode may be further improved.

In the cathode additive of Chemical Formula 1, the element M may improve thermal stability and structural stability by substituting a part of cobalt of each component. The element M may suitably include one or more metal elements and amphoteric elements. Preferably, the element M may include one or more selected from the group consisting of a metal element having a divalent, trivalent or pentavalent oxidation number such as Ni, W, Mg, Ti, or Zr; and an amphoteric element having a trivalent oxidation number such as Al; P, F and B. Preferably, the M element may suitably include P or B which is excellent in reactivity with lithium and capable of forming a more stable composite.

This element M may be added in a ratio that x is 0 or greater and less than about 1, of about 0 to 0.6, of about 0.001 to 0.5, of about 0.01 to 0.4, or particularly of about 0.03 to 0.3, by substituting cobalt elements in combined to lithium (Li), as represented by $Li_6Co_{1-x}M_xO_4$ or $LiCo_{1-x}M_xO_2$ of Chemical Formula 1. By satisfying the substitution ratio, stability of the composite for the cathode additive of Chemical Formula 1 may be improved, and the cathode additive of the Chemical Formula 1 may exhibit excellent irreversible capacity and the like.

The cathode additive may be mixed with a separate cathode active material and used as an irreversible cathode additive. In addition, the cathode additive may act as a cathode active material in itself after serving as an irreversible additive by providing excessive lithium ions in the initial charge-discharge process. Because $Li_6Co_{1-x}M_xO_4$ does not retain the original tetragonal structure and exists in a mixed form of $Li_{6-x}CoO_4$, $CoO_2$ and $LiCoO_2$ as an irreversible additive, the characteristics and/or the capacity of the battery may be improved.

The cathode additive of various exemplary embodiments may further improve the capacity characteristics of the cathode and the lithium secondary battery while exhibiting excellent characteristics as an irreversible additive.

In another aspect of the present invention, provided is a method for preparing the cathode additive. The method may include forming a composite represented by the Chemical formula 1. The method may include calcining and reacting a mixture including a cobalt precursor and a lithium precursor including $Li_2O$, for example, in a reactor, under an inert atmosphere at a temperature of about 500° C. or greater and less than about 700° C.

Particularly, in the step of calcining and reacting a cobalt precursor and a lithium precursor including $Li_2O$, and optionally an M-containing precursor, the reaction/calcination temperature may be less than about 700° C. in order to prepare the cathode additive of Chemical Formula 1 in order to effectively form $LiCo_{1-x}M_xO_2$ and to form the cathode additive in the form of a single complex or the like without causing decomposition of the preformed $Li_6Co_{1-x}M_xO_4$. When the calcination temperature is greater than the predetermined range, for example, greater than about 700° C., $Li_6Co_{1-x}M_xO_4$ may be decomposed, or $LiCo_{1-x}M_xO_2$ may not be formed properly, so that the cathode additive of the embodiment in the form of a single complex may not be formed properly.

Particularly, the calcining step may be carried out under an inert atmosphere at a temperature of about 500° C. or greater and less than about 700° C., or particularly of about 550° C. to 680° C. The first and second calcination steps may suitably be carried out under an inert gas atmosphere including nitrogen, helium, or argon to reduce side reactions. Preferably, the inert gas atmosphere may include a nitrogen gas atmosphere to increase reaction efficiency and reduce side reactions.

The cobalt precursor may suitably include one or more selected from the group consisting of cobalt oxide such as CoO, cobalt hydroxide such as $Co(OH)_2$, cobalt oxyhydroxide, cobalt sulfate, cobalt nitrate, cobalt acetate, cobalt carbonate, cobalt oxalate, cobalt citrate, cobalt halide, cobalt phosphate, and hydrate thereof. Specific examples thereof include CoO, $Co_3O_4$, $Co(OH)_2$, $Co(OH)_3$, and $Co(NO_3)_2 \cdot xH2O$ (1≤x≤7), $Co(COOCH_3)_2$.

The lithium precursor may further include one or more selected from the group consisting of lithium hydroxide, lithium oxyhydroxide, lithium sulfate, lithium nitrate, lithium acetate, lithium carbonate, lithium oxalate, lithium citrate, lithium halide, and hydrate thereof, in addition to the above-described lithium oxide ($Li_2O$). Preferably, the lithium precursor may suitably include $Li_2CO_3$, $LiNO_3$, $LiNO_2$, LiOH, $LiOH \cdot H_2O$, LiH, LiF, LiCl, LiBr, LiI, $CH_3COOLi$, $Li_2SO_4$, $CH_3COOLi$, $Li_3C_6H_5O_7$, and the like.

In addition, the lithium precursor may further include another lithium precursor in addition to the above-described lithium oxide ($Li_2O$). However, since $Li_6Co_{1-x}M_xO_4$ is unstable, the lithium precursor may be a compound having high reactivity similar to the lithium oxide ($Li_2O$).

The M-containing precursor may suitably include an element M. Further, the M-containing precursor may suitably include one or more selected from the group consisting of oxide, hydroxide, oxyhydroxide, sulfate, nitrate, acetate, carbonate, oxalate, citrate, halide, phosphate and hydrate of the element M (e.g., Ni, W, Mg, Ti, Zr, Al; P, F and B).

The lithium precursor, the cobalt precursor and the M-containing precursor may suitably be selected and used by those skilled in the art in such an amount as to satisfy a composition ratio of each element of the Chemical Formula 1 to be finally prepared.

A sintering agent may be optionally added in the mixing of the raw materials (e.g., precursors) described above. The sintering agent may suitably include a compound containing an ammonium ion such as $NH_4F$, $NH_4NO_3$, and $(NH_4)_2SO_4$; a metal oxide such as $B_2O_3$ and $Bi_2O_3$; or a metal halide such as $NiCl_2$ and $CaCl_2$, or a mixture of two or more thereof. The sintering agent may be used in an amount of about 0.01 to 0.2 mol based on 1 mol of the cobalt precursor. When it is used within the above range, sintering property may be improved, thereby improving the performance of the cathode material and preventing reduction of the initial capacity of the battery during a charge-discharge process.

In addition, a moisture removing agent may be optionally added in the mixing of the raw materials (e.g., precursors) described above. The moisture removing agent may suitably include one or more of citric acid, tartaric acid, glycolic acid, and maleic acid. The moisture removing agent may be used in an amount of about 0.01 to 0.2 mol based on 1 mol of the cobalt precursor.

According to another aspect of the present invention, provided is a cathode mix including the above-described cathode additive and a cathode active material.

Since the cathode additive of the embodiment is applied to the cathode mix, an initial irreversible capacity of the anode may be reduced compared to a conventional cathode without the cathode additive of the present invention, thereby increasing an initial efficiency of the cathode, and further improving capacity characteristics of the cathode.

The cathode mix may suitably include the cathode additive:the cathode active material at a weight ratio of about 1:99 to 35:65, of about 3:97 to 30:70, or of about 5:95 to 10:90. Within the above range, a synergistic effect of each component may be displayed.

When the cathode additive and the cathode active material are mixed in the above range, the initial irreversible capacity of the anode may be sufficiently reduced by the cathode additive in the initial charge-discharge (for example, in the first cycle) of the battery, and then reversible insertion and desorption of lithium ions may be stably performed by the cathode active material in the subsequent charge-discharge (for example, after the second cycle).

The cathode mix of the embodiment may be prepared by methods well-known in the art.

The cathode active material as used herein refers to a material capable of reversible insertion and desorption of lithium ions. For example, it may suitably include i) one or more composite oxide of a metal of cobalt, manganese, and nickel; and ii) lithium.

For example, the cathode active material may be one or more compounds represented by the following formulae: $Li_aA_{1-b}R_bD_2$ (wherein, $0.90 \leq a \leq 1.8$ and $0 \leq b \leq 0.5$); $Li_aE_{1-b}R_bO_{2-c}D_c$ (wherein, $0.90 \leq a \leq 1.8$, $0 \leq b \leq 0.5$, and $0 \leq c \leq 0.05$); $LiE_{2-b}R_bO_{4-c}D_c$ (wherein, $0 \leq b \leq 0.5$, $0 \leq c \leq 0.05$); $Li_aNi_{1-b-c}Co_bR_cD_\alpha$ (wherein, $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ (wherein, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_2$ (wherein, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein, $0.90 \leq a \leq 1.8$, $0 \leq b \leq 0.5$, $0 \leq c \leq 0.05$ and $0 < \alpha < 2$); $Li_aNi_bE_cG_dO_2$ (wherein, $0.90 \leq a \leq 1.8$, $0 \leq b \leq 0.9$, $0 \leq c \leq 0.5$ and $0.001 < d < 0.1$); $Li_aNi_bCo_cMn_dGeO_2$ (wherein, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, $0.90 \leq a \leq 1.8$ and $0.001 \leq b \leq 0.1$); $Li_aCoG_bO_2$ (wherein, $0.90 \leq a \leq 1.8$ and $0.001 \leq b \leq 0.1$); $Li_aMnG_bO_2$ (wherein, $0.90 \leq a \leq 1.8$ and $0.001 \leq b \leq 0.1$); $Li_aMn_2G_bO_4$ (wherein, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the formulae above, A may be Ni, Co, Mn, or a combination thereof; R may be Al, Ni, Co, Mn, Cr, Fe, Mg, Sr, V, a rare earth element, or a combination thereof; D may be O, F, S, P, or a combination thereof; E may be Co, Mn, or a combination thereof; Z may be F, S, P, or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; J may be V, Cr, Mn, Co, Ni, Cu, or a combination thereof.

The cathode additive composite, which may be formed in particulate, may include a coating layer on its surface. The cathode additive composite may be used after mixing with a compound having a coating layer. The coating layer may suitably include the coating material such as oxide, hydroxide, oxyhydroxide, oxycarbonate, and hydroxycarbonate of the coating material. The coating material for the coating layer may be amorphous or crystalline. The coating material for the coating layer may suitably include one or more selected from the group consisting of Mg, Al, Co, K, Na, Ca, Si, Ti, V, Sn, Ge, Ga, B, As, and Zr. The coating layer may be formed using any method that does not adversely affect the physical properties of the cathode active material (for example, a spray coating method or a dipping method), when the cathode additive includes the above coating element. The coating methods may be well understood by those skilled in the art, and thus a detailed description thereof will be omitted.

The cathode mix may further include a conductive material, a binder, or a mixture thereof. The conductive material may improve conductivity of the electrode. The conductive material may have electrical conductivity without causing chemical changes in the battery. Examples of the conductive material may suitably include natural graphite, artificial graphite, carbon black, acetylene black, ketjen black, carbon fiber, metallic powders such as copper powder, nickel powder, aluminum powder and silver powder, metal fiber, and the like, and conductive materials such as polyphenylene derivatives may be used alone or in combination thereof.

The binder as used herein refers to a material for binding the cathode active material particles to each other and to attach the cathode active material to the current collector. Representative examples thereof may suitably include polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin and nylon, but are not limited thereto.

Further provided is a lithium secondary battery including a cathode including the above-described cathode mix; an electrolyte; and an anode.

Because the lithium secondary battery has the cathode including the cathode additive and the cathode active material, the initial irreversible capacity of the anode may decrease, the initial efficiency of the cathode may increase, performance deterioration due to oxygen gas during the operation may not occur, and the energy density may not be deteriorated, thereby exhibiting excellent lifetime characteristics.

The lithium secondary battery of the embodiment may be generally prepared (e.g., assembled) according to those well-known in the art. Hereinafter, generally known in the art is briefly mentioned, but this is merely an example, whereby the cathode mix of the above embodiment is not limited.

The cathode may include a cathode current collector; and a cathode mix layer disposed on the cathode current collector and including the cathode mix described above.

The cathode may be prepared by applying an electrode mix, which is a mixture of a cathode active material, a conductive material, and/or a binder, on a cathode current collector, followed by drying. A filler may be further added to the mixture.

The cathode current collector may suitably be formed to have a thickness of about 3 to 500 μm. The cathode current collector is not particularly limited as long as it has high electrical conductivity without causing chemical changes in the battery. For example, the cathode current collector may suitably include stainless steel; aluminum; nickel; titan; sintered carbon; aluminum or stainless steel surface-treated with carbon, nickel, titan or silver; or the like. The current collector may form fine irregularities on its surface to increase adhesive force of the cathode active material, and various forms such as a film, a sheet, a foil, a net, a porous body, a foam body, and a nonwoven fabric body may be used.

The conductive material may suitably be added in an amount of about 1 to 50 wt % based on a total weight of the mixture including the cathode active material. The conductive material is not particularly limited as long as it has electrical conductivity without causing chemical changes in the battery. Examples of the conductive material may suitably include graphite such as natural graphite or artificial graphite; carbon blacks such as carbon black, acetylene black, ketjen black, channel black, furnace black, lamp black and thermal black; conductive fibers such as carbon fiber and metallic fiber; metallic powders such as carbon fluoride powder, aluminum powder and nickel powder; conductive whiskers such as zinc oxide and potassium titanate, conductive metal oxides such as titanium oxide; polyphenylene derivatives; and the like.

The graphite-based material having elasticity may suitably be used as the conductive material, and may be suitably used together with the above materials.

The binder may promote binding between the active material and the conductive material and in binding to the current collector, may suitably be added in an amount of about 1 to 50 wt % based on a total weight of the mixture including the cathode active material. Examples of the binder may suitably include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, and the like.

The filler may be optionally used as a component to inhibit expansion of the electrode. The filler is not particularly limited as long as it is a fibrous material that does not cause chemical changes in the battery. For example, olefin-based polymers such as polyethylene and polypropylene; and fibrous materials such as glass fiber and carbon fiber may be suitably used.

The anode includes a current collector and an anode active material layer formed on the current collector, and the anode active material layer may include an anode active material.

The anode active material may suitably include one or more selected from the group consisting of a carbon-based anode active material, lithium metal, a lithium alloy, Si, $SiO_x$ (0<x<2), a Si—C composite, a Si-Q alloy (Q is an alkali metal, an alkaline earth metal, a Group 13 to Group 16 element, a transition metal, a rare earth element or a combination thereof, except Si), Sn, $SnO_2$, a Sn—C composite, a Sn—R alloy (R is an alkali metal, an alkaline earth metal, a Group 13 to Group 16 element, a transition metal, and a rare earth element. The active material may not include a mixture formed by adding Sn.

The anode current collector may suitably be formed to have a thickness of about 3 to 500 μm. The anode current collector is not particularly limited as long as it has electrical conductivity without causing chemical changes in the battery. For example, the anode current collector may suitably include one or more of copper; stainless steel; aluminum; nickel; titan; sintered carbon; copper or stainless steel surface-treated with carbon, nickel, titan or silver; an aluminum-cadmium alloy; or the like. Further, similarly to the cathode current collector, the anode current collector may form fine irregularities on its surface to increase adhesive force of the anode active material, and various forms such as a film, a sheet, a foil, a net, a porous body, a foam body, and a nonwoven fabric body may suitably be used.

The lithium secondary battery according to various exemplary embodiments of the present invention may be a lithium ion battery, a lithium ion polymer battery, or a lithium polymer battery, which may include various types of the electrolyte and/or the separator typically used in the related arts.

When the lithium secondary battery is a lithium ion battery using a liquid electrolyte, the liquid electrolyte may be impregnated into the separator. The separator is interposed between the cathode and the anode, and an insulating thin film having high ion permeability and mechanical strength is used. The pore diameter of the separator may suitably range from about 0.01 to about 10 μm and the thickness may suitably range from about 5 to about 300 μm. The separator may suitably include a sheet or a nonwoven fabric made of an olefin-based polymer such as polypropylene, which is chemically resistant and hydrophobic, glass fiber, polyethylene, or the like. When a solid electrolyte such as a polymer is used as the electrolyte, the solid electrolyte may also serve as a separator.

The liquid electrolyte may be a non-aqueous electrolyte containing a lithium salt. The non-aqueous electrolyte containing a lithium salt may suitably include a non-aqueous electrolyte and lithium. Examples of the non-aqueous electrolyte may suitably include a non-aqueous organic solvent, an organic solid electrolyte, an inorganic solid electrolyte, and the like, but are not limited thereto.

Examples of the non-aqueous organic solvent may suitably include, but not be limited to, non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte may suitably include, but not be limited to, polyethylene derivatives, polyethylene oxide derivatives, polypropylene oxide derivatives, phosphoric acid ester polymers, polyagitation lysine, polyester sulfide, polyvinyl alcohols, polyvinylidene fluoride, polymers containing a secondary dissociation group, and the like.

Examples of the inorganic solid electrolyte may suitably include, but not be limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like.

The lithium salt may be soluble in the non-aqueous electrolyte and examples thereof may suitably include, but not be limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, lithium imide, and the like.

The non-aqueous electrolyte containing a lithium salt may suitably include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, in order to improve charge-discharge characteristics and flame retardancy, and the like. In some cases, a halogen-containing solvent such as carbon tetrachloride and ethylene trifluoride may be further added to give nonflammability, or carbon dioxide gas may be further added to improve high-temperature storage characteristics. Other additives, for example, FEC (Fluoro-Ethylene Carbonate), PRS (Propene sultone), and the like may be further added thereto.

The lithium salt such as $LiPF_6$, $LiClO_4$, $LiBF_4$, $LiN(SO_2CF_3)_2$, and the like may be added to a mixed solvent of a cyclic carbonate such as EC and PC, which is a high-dielectric solvent, and a linear carbonate such as DEC, DMC and EMC, which is a low-viscosity solvent, to prepare a non-aqueous electrolyte containing a lithium salt.

The lithium secondary battery according to various exemplary embodiments of the present invention may be implemented as a battery module including the same as a unit cell, a battery pack including the battery module, and a device including the battery pack as a power source.

Examples of the device may include an electric vehicle, a hybrid electric vehicle, a plug-in hybrid electric vehicle, or a power storage system, but is not limited thereto.

According to the present invention, a cathode additive may provide a lithium secondary battery having high irreversible capacity.

Thus, the lithium secondary battery including the cathode additive may overcome the irreversible capacity loss of the anode material while exhibiting higher capacity characteristics even with use of the anode material having high energy density.

EXAMPLES

Hereinafter, the function and effect of the present invention will be described in more detail through specific examples of the present invention. However, these examples are for illustrative purposes only, and the invention is not intended to be limited by these examples.

Example 1

89.6 g of $Li_2O$ as a raw material for lithium and 25 g of CoO as a raw material of cobalt were mixed and then heat-treated and calcined at a temperature of 550° C. for 18 hours under a nitrogen atmosphere. The product was cooled down to obtain cathode additive particles.

Example 2

89.6 g of $Li_2O$ as a raw material for lithium and 25 g of CoO as a raw material of cobalt were mixed and then heat-treated and calcined at a temperature of 600° C. for 18 hours under a nitrogen atmosphere. The product was cooled down to obtain cathode additive particles.

Example 3

89.6 g of $Li_2O$ as a raw material for lithium, 25 g of CoO as a raw material of cobalt and 5.3 g of ammonium phosphate as a raw material of element M were mixed and then heat-treated and calcined at a temperature of 600° C. for 18 hours under a nitrogen atmosphere. The product was cooled down to obtain cathode additive particles.

Comparative Example 1

89.6 g of $Li_2O$ as a raw material for lithium and 25 g of CoO as a raw material of cobalt were mixed and then heat-treated and calcined at a temperature of 700° C. for 18 hours under a nitrogen atmosphere. The product was cooled down to obtain cathode additive particles.

Experimental Example 1: Analysis of a Cathode Additive and a Charge-Discharge Test (Evaluation of Capacity Characteristics when a Cathode Additive is Used Alone)

X-ray diffraction (XRD) analysis using Cu Kα X-ray (X-rα) was performed on the cathode additive particles prepared in Examples 1 to 3 and Comparative Example 1, and the result of Example 1 is shown in FIG. 1. For this XRD analysis, a XRD analysis equipment from Bruker (product name: $D_4$ Endeavor) was used.

As shown in FIG. 1, peaks derived from $Li_6CoO_4$ and $LiCoO_2$ were confirmed. Particularly, the peak derived from $LiCoO_2$, for example, a peak at 2θ of 18.98°±0.2° or 45.27°±0.2°, had an intensity of 25% or less, based on an intensity of the peak derived from $Li_6CoO_4$, for example, a peak at 2θ of 23.5°±0.2°. This result indicated that $LiCoO_2$ was included in the cathode additive of Example 1, and the entire cathode additive had a single complex form.

In addition, from the XRD analysis results, fractions of each component of Examples 1 to 3 and Comparative Example 1 were analyzed/calculated by Rietveld refinement analysis and summarized in Table 1 below. In this Rietveld refinement analysis, analytical conditions described in J. Appl. Cryst. (1999). 32, 36-50 'Rietveld refinement guidelines' were applied.

TABLE 1

|  | $Li_6Co_{1-x}M_xO_4$ (mol %) | $LiCo_{1-x}M_xO_2$ (mol %) | $Li_2O$ (mol %) | Type of M |
|---|---|---|---|---|
| Example 1 | 86.7 | 4.9 | 8.3 | None |
| Example 2 | 90.2 | 3.3 | 6.5 | None |
| Example 3 | 95.0 | 3.0 | 2.0 | P (x = 0.05) |
| Comp. Example 1 | 93.7 | 0 | 6.3 | None |

As shown in Table 1, Examples 1 to 3 was a single complex including $LiCo_{1-x}M_xO_2$.

A cathode was prepared using the cathode additive particles prepared in Examples and Comparative Example, and then X-ray diffraction (XRD) analysis was performed on structure changes of the cathode additive included in the electrode while charging-discharging at a constant voltage. The results of Example 1 are shown in FIG. 2, respectively.

For example, the cathode additive prepared in Examples or Comparative Example, a carbon black conductive material, and a PVdF binder were mixed in a weight ratio of 85:10:5 in N-methylpyrrolidone solvent to prepare a composition for forming a cathode. This composition was applied to an aluminum current collector, followed by drying and rolling. Li-metal was used as an anode, and a coin-cell type battery was manufactured using an electrolyte containing 1M of $LiPF_6$ in a solvent having a mixing volume ratio of EC:DMC:DEC to be 1:2:1.

Figure 2:
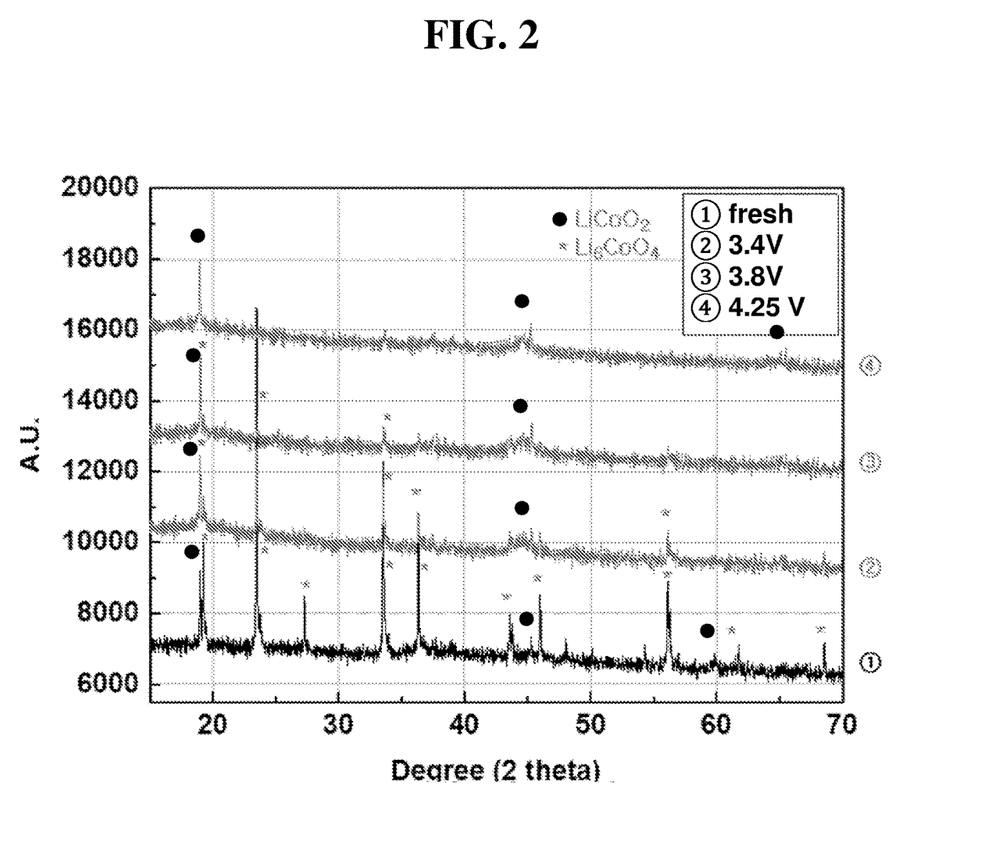
FIG. 2 is a graph showing results of analyzing structural changes of an exemplary cathode additive by performing XRD analysis after obtaining an exemplary battery using the cathode additive obtained in Example 1 and then charging/discharging at a predetermined voltage.

The prepared battery was charged and discharged at a predetermined voltage shown in FIG. 2 at a temperature of 25° C., and then the cathode was separated and subjected to XRD analysis.

As shown in FIG. 2, $Li_6Co_{1-x}M_xO_4$ contained in the cathode additive of Example 1 did not retain the original tetragonal structure, and presented in a mixed form of $Li_{6-x}CoO_4$, $CoO_2$ and $LiCoO_2$ after providing an excessive amount of lithium ions to the anode as an irreversible additive in an initial charge-discharge process.

On the other hand, the same coin-cell type battery as above was charged to 4.25 V at a temperature of 25° C. and 0.1 C, and then the voltage was maintained in a CV mode until it reached 0.005 C. Thereafter, the battery was discharged to 2.5V at 0.1 C. The capacity characteristics of the additives of Example 1 and Comparative Example 1 were evaluated using this charge-discharge test, and the results are shown in FIG. 3.

Figure 3:
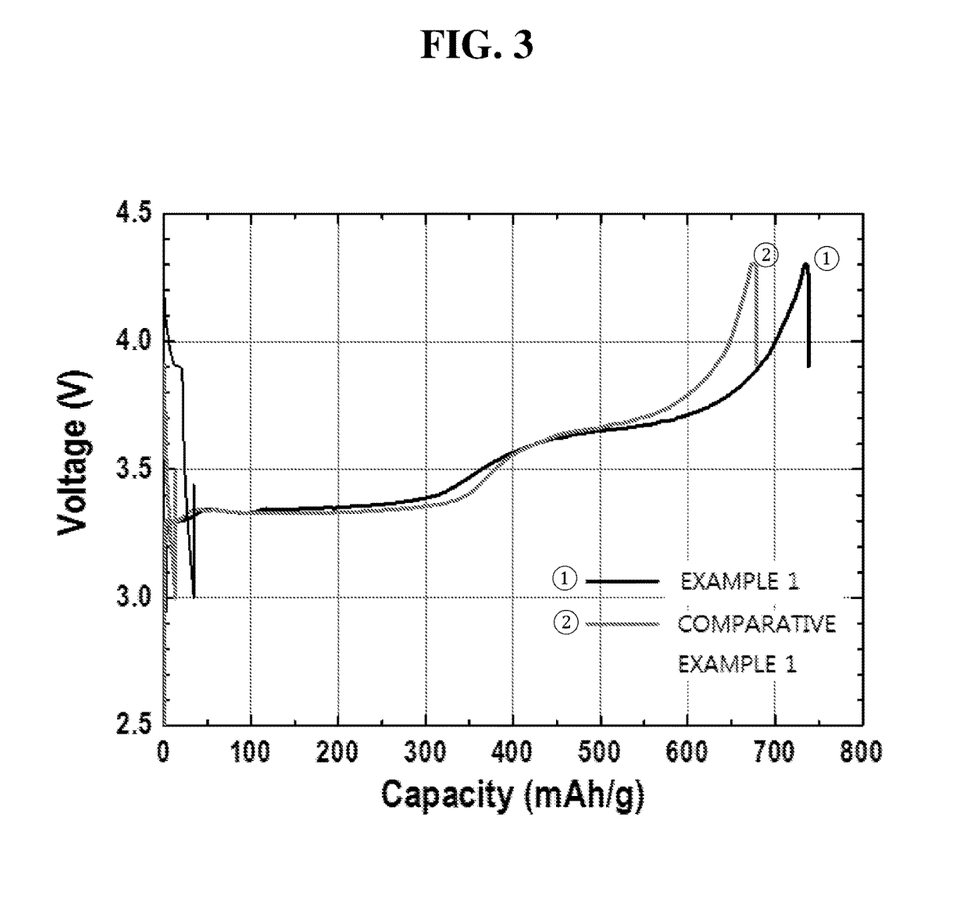
FIG. 3 is a graph showing comparison results of the capacity characteristics of an exemplary cathode additives obtained in Example 1 and Comparative Example 1 by conducting the charge/discharge test in Experimental Example 1.

As shown in FIG. 3, the additive of Example 1 exhibited greater capacity characteristics than Comparative Example 1. Accordingly, the additive of Example 1 had greater irreversible capacity than Comparative Example 1.

Experimental Example 2: A Charge-Discharge Test (Evaluation of Capacity Characteristics when a Cathode Additive and a Cathode Active Material are Used Together)

The cathode additives prepared in Example 1 and Comparative Example 1, a cathode active material of $Li(Ni_{0.8}Co_{0.1}Mn_{0.1})O_2$, a carbon black conductive material, and a PVdF binder were mixed in an N-methylpyrrolidone solvent in a weight ratio of 5:80:10:5 to prepare a composition for forming a cathode. This composition was applied to an aluminum current collector, followed by drying and rolling to prepare a cathode. A graphite anode, an electrolyte containing 1M of $LiPF_6$ in a solvent having a mixing volume ratio of EC:DMC:DEC to be 1:2:1, and a PE separator were used to manufacture a coin-cell type battery.

The battery was charged to 4.25 V at a temperature of 25° C. and 0.1 C, and then discharged to 2.5V at 0.1 C. The capacity characteristics of the battery prepared using the additives of Example 1 and Comparative Example 1 and the cathode active material were evaluated using this charge-discharge test, and the results are shown in FIG. 4.

Figure 4:
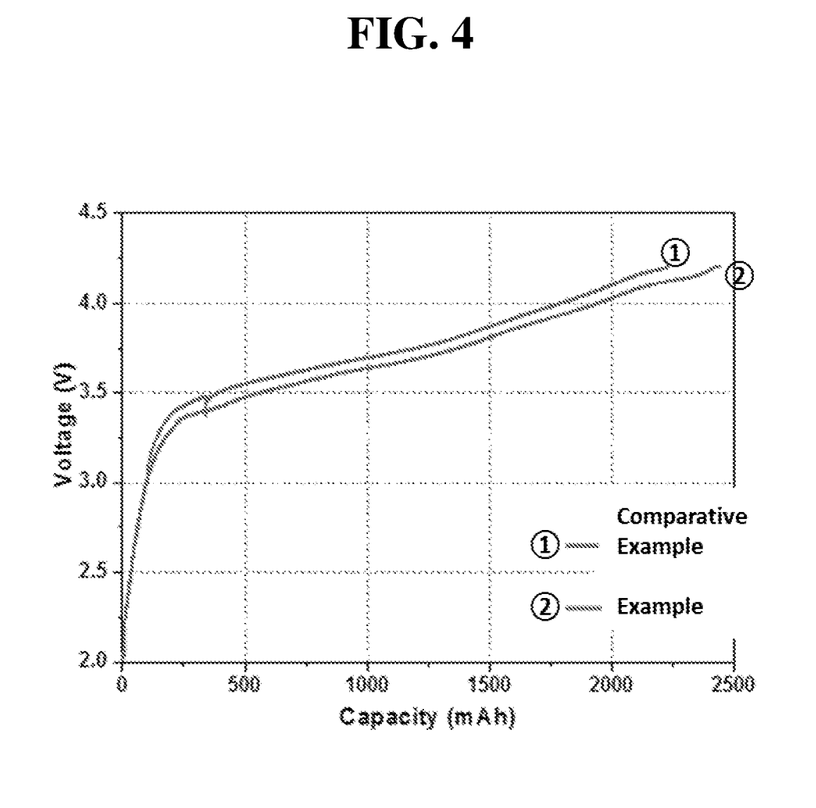
FIG. 4 is a graph showing comparison results of capacity characteristics of an exemplary battery prepared using an exemplary cathode additive obtained in Example 1 and Comparative Example 1 together with an exemplary cathode active material by conducting the charge/discharge test in Experimental Example 2.

As shown in FIG. 4, the battery using the cathode additive of Example 1 exhibited improved capacity characteristics, compared with the battery using the cathode additive of Comparative Example 1. The improved capacity characteristics may be obtained because the cathode additive of Example 1 may act as an irreversible additive, and then $Li_{6-x}CoO_4$ and $LiCoO_2$ contained in the mixed form derived therefrom may act as a cathode active material to further improve the capacity of the battery.

The aforementioned exemplary embodiments are merely illustrative but are construed as limiting the present invention. The scope of the present invention is represented by the claims below rather than the detailed description, and the meaning and scope of the claims and all modifications or variations derived from equivalents thereof are intended to be incorporated within the scope of the present invention.

The invention claimed is:

1. A cathode additive for a lithium secondary battery, comprising:

a composite represented by the following Chemical Formula 1:

$(1-y-z)(Li_6Co_{1-x}M_xO_4)-y(LiCo_{1-x}M_xO_2)-z(Li_2O)$, [Chemical Formula 1]

wherein M comprises one or more elements selected from the group consisting of P, B, F, Ni, W, Ti, Zr, Mg and Al, $0 \leq x < 1.0$, wherein y and z are molar ratios of $LiCo_{1-x}M_xO_2$ and $Li_2O$ contained in the composite of Chemical Formula 1, $0 < y \leq 0.10$, and $0 \leq z \leq 0.20$, wherein the composite comprises the $Li_6Co_{1-x}M_xO_4$, the $LiCo_{1-x}M_xO_2$ and the physically mixed and connected to form a single particulate or a complex.

2. The cathode additive for a lithium secondary battery of claim 1, wherein the composite of Chemical Formula 1 in the form of a single particulate or a complex has an additional peak at 2θ of 18.98°±0.2° or 45.27°±0.2° in XRD (X-ray diffraction) analysis by Cu Kα X-ray (X-rα), and an intensity of the additional peak is 2 to 25% based on an intensity of the peak at 2θ of 23.5°±0.2°.

3. The cathode additive for a lithium secondary battery of claim 1, wherein the cathode additive comprises the $LiCo_{1-x}M_xO_2$ in an amount of greater than 0 wt % and 0.1 wt % or less, and the $Li_2O$ in an amount of 0 to 0.7 wt %, based on a total amount of the cathode additive as 100 wt %.

4. A method for preparing a cathode additive of a lithium secondary battery of claim 1, comprising a step of:

forming a composite represented by the Chemical formula 1 by mixing and calcining a mixture comprising a cobalt precursor and a lithium precursor comprising Li$_2$O under an inert atmosphere at a temperature of 500° C. or greater and less than 700° C.

5. The method for preparing the cathode additive of claim 4,
wherein the mixture further comprises an M-containing precursor.

6. The method for preparing the cathode additive of claim 5,
wherein the cobalt precursor comprises one or more selected from the group consisting of cobalt oxide, cobalt hydroxide, cobalt oxyhydroxide, cobalt sulfate, cobalt nitrate, cobalt acetate, cobalt carbonate, cobalt oxalate, cobalt citrate, cobalt halide, cobalt phosphate, and hydrate thereof, and
the M precursor comprises at least one selected from the group consisting of an oxide, hydroxide, oxyhydroxide, sulfate, nitrate, acetate, carbonate, oxalate, citrate, halide, phosphate and hydrate of the element M.

7. A cathode mix comprising the cathode additive of claim 1; and a cathode active material.

8. The cathode mix of claim 7,
wherein a weight ratio of the cathode additive:the cathode active material is 1:99 to 35:65.

9. The cathode mix of claim 7,
wherein the cathode active material comprises one or more selected from the group consisting of composite oxides of a metal of cobalt, manganese, and nickel; and lithium.

10. A lithium secondary battery comprising: a cathode comprising a cathode mix of claim 7; an electrolyte; and an anode.

* * * * *